United States Patent
Bai et al.

(10) Patent No.: US 8,410,842 B1
(45) Date of Patent: Apr. 2, 2013

(54) POWER SWITCH CIRCUIT

(75) Inventors: Yun Bai, Shenzhen (CN); Song-Lin Tong, Shenzhen (CN); Peng Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/340,638

(22) Filed: Dec. 29, 2011

(51) Int. Cl.
*H03K 17/687* (2006.01)

(52) U.S. Cl. .................. 327/427; 327/434; 327/437

(58) Field of Classification Search .................. None
See application file for complete search history.

(56) References Cited

U.S. PATENT DOCUMENTS

| | | | | |
|---|---|---|---|---|
| 7,598,627 B2* | 10/2009 | Huang et al. | .......... | 307/64 |
| 7,639,063 B2* | 12/2009 | Xiong | .......... | 327/398 |
| 7,930,570 B2* | 4/2011 | Zou et al. | .......... | 713/300 |
| 8,201,003 B2* | 6/2012 | Chen | .......... | 713/320 |
| 8,205,104 B2* | 6/2012 | Hu | .......... | 713/300 |
| 8,255,718 B2* | 8/2012 | Xi | .......... | 713/320 |
| 2008/0150362 A1* | 6/2008 | Huang et al. | .......... | 307/64 |
| 2010/0001589 A1* | 1/2010 | Shi | .......... | 307/115 |
| 2012/0239951 A1* | 9/2012 | Zhou | .......... | 713/320 |
| 2012/0242306 A1* | 9/2012 | Tong et al. | .......... | 323/273 |
| 2012/0306435 A1* | 12/2012 | Tu et al. | .......... | 320/107 |
| 2012/0331312 A1* | 12/2012 | Lu | .......... | 713/300 |
| 2013/0007485 A1* | 1/2013 | Kim | .......... | 713/320 |

* cited by examiner

*Primary Examiner* — Tuan T Lam
(74) *Attorney, Agent, or Firm* — Altis Law Group, Inc.

(57) ABSTRACT

A power switch circuit includes a control circuit, and first and second detecting circuits. The control circuit includes first and second field effect transistors (FETs) and first and second sensing resistors. The first detecting circuit includes two input terminals connected to the first and second ends of the first sensing resistor and an output terminal connected to the first FET. The first detecting circuit controls the first FET to be turned on or turned off according to the voltages of the first and second ends of the first sensing resistor. The second detecting circuit includes two input terminals connected to the first and second ends of the second sensing resistor and an output terminal connected to the second FET. The second detecting circuit controls the second FET to be turned on or turned off according to the voltages of the first and second ends of the second sensing resistor.

3 Claims, 3 Drawing Sheets

POWER SWITCH CIRCUIT

BACKGROUND

1. Technical Field

The present disclosure relates to a power switch circuit.

2. Description of Related Art

At present, a 5 volt (V) standby voltage output from a 5V standby power port of a power supply is provided to a basic input output system (BIOS) of a computer before the computer is powered on, to signal the BIOS to initialize the computer system. After the computer is powered on, a 5V voltage output from a 5V power port of the power supply is provided to the computer. The 5V standby power port is shut off, however, the 5V standby voltage will continue for a short time and may be provided to the 5V power port of the power supply, possibly causing damage to the power supply. Therefore, there is room for improvement in the art.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of example and not by way of limitation. References to "an" or "one" embodiment in this disclosure are not necessarily to the same embodiment, and such references mean at least one.

Figure 1:
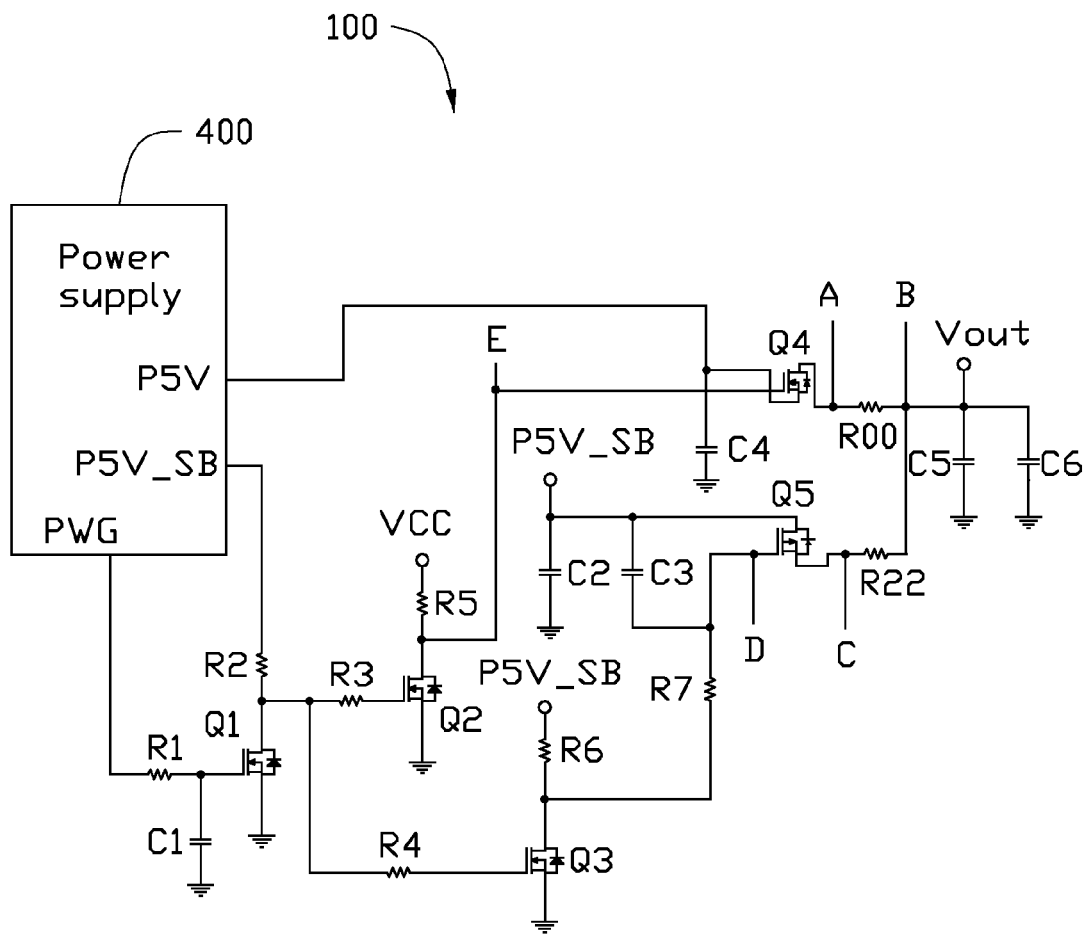
FIG. 1 is a circuit diagram of a control circuit of a power switch circuit in accordance with an exemplary embodiment.
Figure 2:
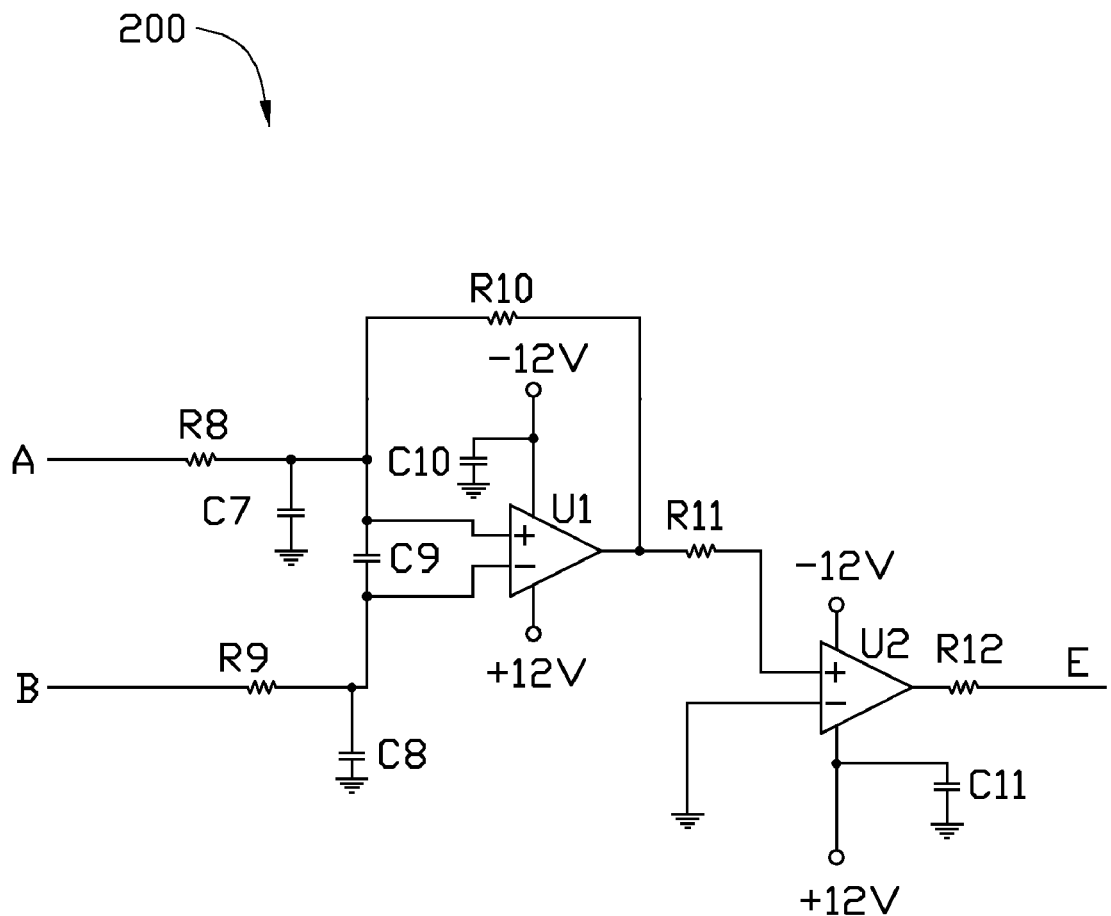
FIG. 2 is a circuit diagram of a first detecting circuit of the power switch circuit in accordance with an exemplary embodiment.
Figure 3:
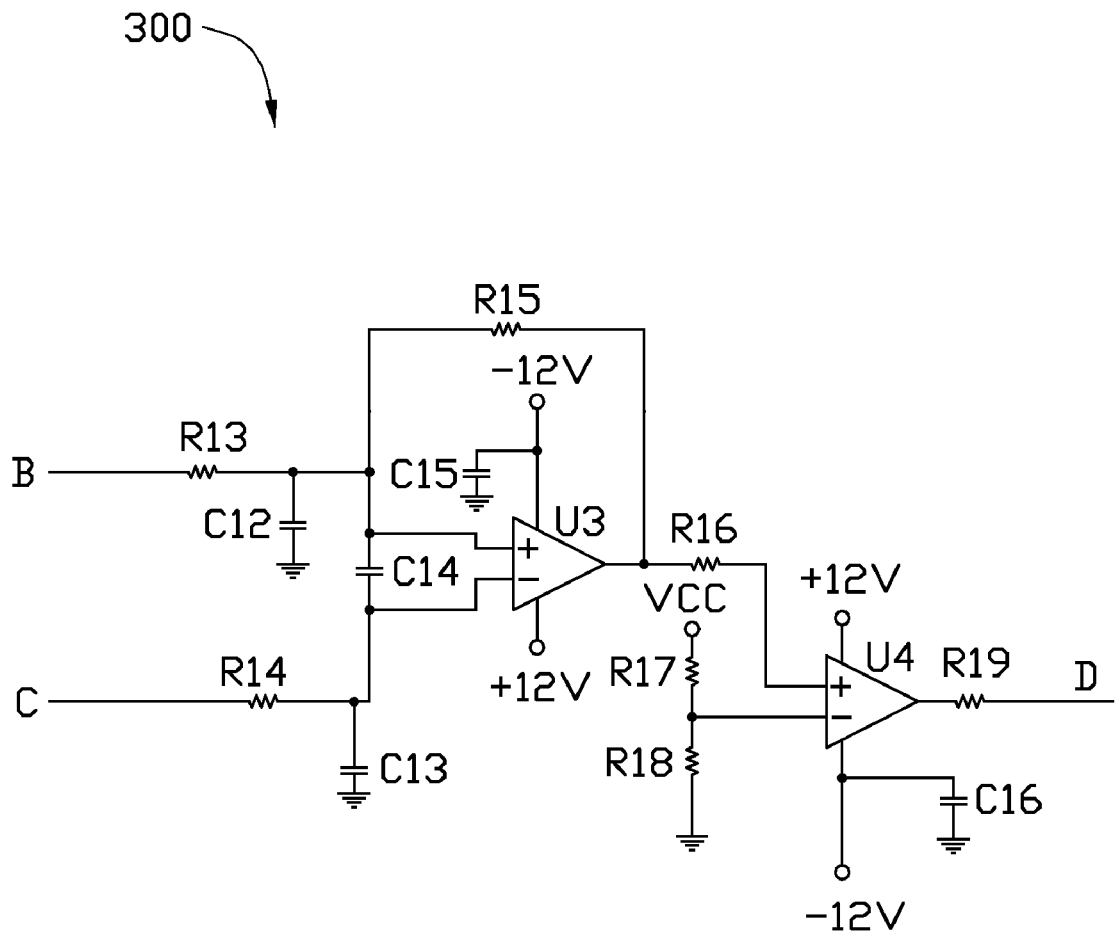
FIG. 3 is a circuit diagram of a second detecting circuit of the power switch circuit in accordance with an exemplary embodiment.

Referring to FIGS. 1 to 3, a power switch circuit in accordance with an exemplary embodiment includes a control circuit 100, a first detecting circuit 200, and a second detecting circuit 300.

The control circuit 100 includes resistors R1-R7, sensing resistors R00 and R22 for sensing voltages, capacitors C1-C6, field effect transistors (FETs) Q1-Q5, and a voltage output terminal Vout. A gate of the FET Q1 is connected to a signal pin PWG of a power supply 400 through the resistor R1 and also grounded through the capacitor C1. A source of the FET Q1 is grounded. A drain of the FET Q1 is connected to a standby power port P5V_SB of the power supply 400 through the resistor R2, connected to a gate of the FET Q2 through the resistor R3, and connected to a gate of the FET Q3 through the resistor R4. Sources of the FETs Q2 and Q3 are grounded. A drain of the FET Q2 is connected to a power source VCC through the resistor R5 and also connected to a gate of the FET Q4. A source of the FET Q4 is connected to a power port P5V of the power supply 400 and also grounded through the capacitor C4. A drain of the FET Q4 is connected to a first end of the sensing resistor R00. A second end of the sensing resistor R00 is connected to the voltage output terminal Vout. The capacitors C5 and C6 are connected in parallel between the voltage output terminal Vout and ground.

A drain of the FET Q3 is connected to the standby power port P5V_SB of the power supply 400 through the resistor R6 and also connected to a gate of the FET Q5 through the resistor R7. A drain of the FET Q5 is connected to the standby power port P5V_SB and also grounded through the capacitor C2. The capacitor C3 is connected between the gate and the drain of the FET Q5. A source of the FET Q5 is connected to a first end of the sensing resistor R22. A second end of the sensing resistor R22 is connected to a second end of the sensing resistor R00. The FETs Q1-Q4 are n-channel FETs, the FET Q5 is a p-channel FET.

The first detecting circuit 200 includes resistors R8-R12, capacitors C7-C11, and comparators U1 and U2. A non-inverting input terminal of the comparator U1 is connected to the first end of the sensing resistor R00 through the resistor R8. The capacitor C7 is connected between the non-inverting input terminal of the comparator U1 and ground. An inverting input terminal of the comparator U1 is connected to the second end of the sensing resistor R00 through the resistor R9. The capacitor C8 is connected between the inverting input terminal of the comparator U1, and ground. The capacitor C9 is connected between the inverting input terminal and the non-inverting input terminal of the comparator U1. A positive voltage terminal of the comparator U1 is connected to a power source +12V. A negative voltage terminal of the comparator U1 is connected to a power source −12V and also grounded through the capacitor C10. An output terminal of the comparator U1 is connected to a non-inverting input terminal of the comparator U2 through the resistor R11. The resistor R10 is connected between the non-inverting input terminal and the output terminal of the comparator U1. An inverting input terminal of the comparator U2 is grounded. A negative voltage terminal of the comparator U2 is connected to the power source −12V. A positive voltage terminal of the comparator U2 is connected to the power source +12V. The capacitor C11 is connected between the positive voltage terminal of the comparator U2 and ground. An output terminal of the comparator U2 is connected to the gate of the FET Q4 through the resistor R12.

The second detecting circuit 300 includes resistors R13-R19, capacitors C12-C16, and comparators U3 and U4. A non-inverting input terminal of the comparator U3 is connected to the second end of the sensing resistor R22 through the resistor R13. The capacitor C12 is connected between the non-inverting input terminal of the comparator U3 and ground. An inverting input terminal of the comparator U3 is connected to the first end of the sensing resistor R22 through the resistor R14. The capacitor C13 is connected between the inverting input terminal of the comparator U3, and ground. The capacitor C14 is connected between the non-inverting input terminal and the inverting input terminal of the comparator U3. A negative voltage terminal of the comparator U3 is connected to the power source −12V and also grounded through the capacitor C15. A positive voltage terminal of the comparator U3 is connected to the power source +12V. An output terminal of the comparator U3 is connected to a non-inverting input terminal of the comparator U4 through the resistor R16. The resistor R15 is connected between the non-inverting terminal and the output terminal of the comparator U3. An inverting input terminal of the comparator U4 is connected to the power source VCC through the resistor R17 and also grounded through the resistor R18. A positive voltage terminal of the comparator U4 is connected to the power source +12V. A negative voltage terminal of the comparator U4 is connected to the power source −12V and also grounded through the capacitor C16. An output terminal of the comparator U4 is connected to the gate of the FET Q5 through the resistor R19. In one embodiment, the capacitors C1-C16 are used for filtering. The resistors R1-R19 are used for limiting current. The power supply 400 provides the power sources VCC, +12V, and −12V.

In use, before the computer is powered on, the standby power port P5V_SB of the power supply 400 outputs a 5 volt (V) standby voltage, the power port P5V is shut off, and the signal pin PWG outputs a low level signal. The FET Q1 receives the low level signal from the signal pin PWG of the power supply 400 and is turned off. The FETs Q2 and Q3 each receive a high level signal and are turned on. The FET Q4 receives a low level signal and is turned off. The FET Q5 receives a low level signal and is turned on. Thus, the standby power port P5V_SB of the power supply 400 outputs a 5V standby voltage to a motherboard (not shown) of the computer through the FET Q5 and the voltage output terminal Vout, to signal the BIOS to initialize the computer system.

When the computer is powered on, the standby voltage port P5V_SB of the power supply 400 is shut off, the voltage port P5V outputs a 5V voltage to the motherboard of the computer, and the signal pin PWG outputs a high level signal. The FET Q1 receives the high level signal from the signal pin PWG of the power supply 400 and is turned on. The FETs Q2 and Q3 each receive a low level signal and are turned off. At the same time, the FET Q4 receives a high level signal and is turned on. The power port P5V of the power supply 400 outputs a 5V voltage to the motherboard through the FET Q4 and the voltage output terminal Vout. The FET Q5 receives a high level signal and is turned off, however, the 5V standby voltage continues for a short time and this voltage is provided to the power port P5V of the power supply 400 through the sensing resistor R00 and the FET Q4. Therefore, the non-inverting input terminal and the inverting input terminal of the comparator U1 obtain the voltages of the first and second ends of the sensing resistor R00, in which situation the voltage of the inverting input terminal of the comparator U1 is greater than the voltage of the non-inverting input terminal of the comparator U1, and thus the comparator U1 outputs a low level signal to the non-inverting input terminal of the comparator U2. The comparator U2 outputs a low level signal to the FET Q4. The FET Q4 is turned off, to prevent the 5V standby voltage from being provided to the power port P5V of the power supply 400 and causing damage to the power supply 400. As the 5V standby voltage disappears, the voltage of the inverting input terminal becomes less than the voltage of the non-inverting input terminal of the comparator U1. The comparator U1 outputs a high level signal to the non-inverting input terminal of the comparator U2. The comparator U2 outputs a high level signal to the FET Q4. The FET Q4 is turned on. The power port P5V of the power supply 400 outputs a 5V voltage to the motherboard through the FET Q4 and the voltage output terminal Vout.

When the computer is powered off, the FET Q1 receives a low level signal from the signal pin PWG of the power supply 400 and is turned off. Each of the FETs Q2 and Q3 receive a high level signal and are turned on. The FET Q5 receives a low level signal and is turned on. The standby power port P5V_SB of the power supply 400 outputs a 5V standby voltage to the motherboard through the FET Q5 and the voltage output terminal Vout. At the same time, the FET Q4 receives a low level signal and is turned off. The power port P5V of the power supply 400 is shut off. The 5V voltage continues for a short time and is provided to the standby power port P5V_SB of the power supply 400 through the sensing resistor R22 and the FET Q5, and the non-inverting input terminal and the inverting input terminal of the comparator U3 obtain the voltages of the second and first ends of the sensing resistor R22. The voltage of the non-inverting input terminal of the comparator U3 is now greater than the voltage of the inverting input terminal of the comparator U3, thus the comparator U3 outputs a high level signal to the non-inverting input terminal of the comparator U4. The comparator U4 outputs a high level signal to the FET Q5. The FET Q5 is turned off, and prevents the 5V voltage from being provided to the standby voltage port P5V_SB of the power supply 400 and causing damage to the power supply 400. After the 5V voltage has disappeared, the voltage of the inverting input terminal of the comparator U3 is then greater than the voltage of the non-inverting input terminal of the comparator U3, and the comparator U3 outputs a low level signal to the non-inverting input terminal of the comparator U2. The comparator U2 outputs a low level signal to the FET Q5. The FET Q5 is turned on. The 5V standby voltage output from the standby power port P5V_SB of the power supply 400 is thus provided to the motherboard through the FET Q5 and the voltage output terminal Vout.

The power switch circuit can prevent the power supply 400 from being damaged, by virtue of the control circuit 100, and the first and second detecting circuits 200 and 300.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A power switch circuit, comprising:
a control circuit comprising first to fifth field effect transistors (FETs), a first sensing resistor, a second sensing resistor, and a voltage output terminal, wherein a gate of the first FET is connected to a signal pin of a power supply, a source of the first FET is grounded, a drain of the first FET is connected to a first power port of the power supply through a first resistor, connected to a gate of the second FET, and also connected to a gate of the third FET, sources of the second and third FETs are grounded, a drain of the second FET is connected to a power source through a second resistor and also connected to a gate of the fourth FET, a source of the fourth FET is connected to a second power port of the power supply and also grounded through a first capacitor, a drain of the fourth FET is connected to a first end of the first sensing resistor, a second end of the first sensing resistor is connected to the voltage output terminal, a drain of the third FET is connected to the first power port of the power supply through a third resistor and also connected to a gate of the fifth FET, a drain of the fifth FET is connected to the first power port of the power supply and also grounded through a second capacitor, a source of the fifth FET is connected to a first end of the second sensing resistor, a second end of the second sensing resistor is connected to the second end of the first sensing resistor and the voltage output terminal;
a first detecting circuit comprising two input terminals connected to the first and the second ends of the first sensing resistor and an output terminal connected to the gate of the fourth FET, wherein the first detecting circuit controls the fourth FET to be turned on or turned off according to voltages of the first and second ends of the first sensing resistor; and a second detecting circuit comprising two input terminals connected to the first and second ends of the second sensing resistor and an output terminal connected to the gate of the fifth FET, wherein the second detecting circuit controls the fifth FET to be turned on or turned off according to voltages of the first and second ends of the second sensing resistor.

2. The power switch circuit of claim 1, wherein the first detecting circuit comprises a first comparator and a second comparator, a non-inverting input terminal of the first comparator is connected to the first end of the first sensing resistor, an inverting input terminal of the first comparator is connected to the second end of the first sensing resistor, an output terminal of the first comparator is connected to a non-inverting input terminal of the second comparator, an inverting input terminal of the second comparator is grounded, an output terminal of the second comparator functions as the output terminal of the first detecting circuit to be connected to the gate of the fourth FET.

3. The power switch circuit of claim 2, wherein the second detecting circuit comprises a third comparator and a fourth comparator, a non-inverting input terminal of the third comparator is connected to the first end of the second sensing resistor, an inverting input terminal of the third comparator is connected to the second end of the second sensing resistor, an output terminal of the third comparator is connected to a non-inverting input terminal of the fourth comparator, an inverting input terminal of the fourth comparator is connected to a power source through a fourth resistor and also grounded through a fifth resistor, an output terminal of the fourth comparator functions as the output terminal of the second detecting circuit to be connected to the gate of the fifth FET.

* * * * *